United States Patent
Xu

(10) Patent No.: US 11,895,729 B2
(45) Date of Patent: Feb. 6, 2024

(54) DISCONTINUOUS RECEPTION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 368 days.

(21) Appl. No.: 17/393,169

(22) Filed: Aug. 3, 2021

(65) Prior Publication Data
US 2021/0368578 A1    Nov. 25, 2021

Related U.S. Application Data

(63) Continuation of application No. PCT/CN2019/075283, filed on Feb. 15, 2019.

(51) Int. Cl.
*H04W 4/00*      (2018.01)
*H04W 76/28*    (2018.01)
(Continued)

(52) U.S. Cl.
CPC ........... *H04W 76/28* (2018.02); *H04W 24/08* (2013.01); *H04W 72/0446* (2013.01); *H04W 72/0453* (2013.01); *H04W 72/23* (2023.01)

(58) Field of Classification Search
CPC . H04W 76/28; H04W 24/08; H04W 72/0446; H04W 72/0453; H04W 72/04
(Continued)

(56) References Cited

U.S. PATENT DOCUMENTS 8,738,021 B2 * 5/2014 Mutya ................. H04W 88/06
                                                              455/452.1
10,075,877 B1 * 9/2018 Terzis .................. H04L 1/0003
(Continued)

FOREIGN PATENT DOCUMENTS

CN    103139920 A    6/2013
CN    105722195 A    6/2016
(Continued)

OTHER PUBLICATIONS

International Search Report dated May 30, 2019 of PCT/CN2019/075283 (4 pages).
(Continued)

*Primary Examiner* — Marceau Milord
(74) *Attorney, Agent, or Firm* — PERKINS COIE LLP

(57) ABSTRACT

Provided in implementations of the present disclosure are a discontinuous reception (DRX) method, a terminal device and a network device, which may optimize a DRX mechanism, thereby further reducing power consumption. The method includes: a first terminal device monitoring a downlink control channel, the downlink control channel carrying m pieces of DRX information which are form terminal devices respectively, the m terminal devices including the first terminal device, m being a positive integer, and each piece of DRX information among the m pieces of DRX information being used to indicate at least one of the following: a target BWP, a target DRX configuration, target DRX parameters and the duration during which a PDCCH is monitored within an active period of a DRX cycle.

24 Claims, 5 Drawing Sheets

(51) Int. Cl.
  *H04W 24/08* (2009.01)
  *H04W 72/0446* (2023.01)
  *H04W 72/0453* (2023.01)
  *H04W 72/23* (2023.01)
(58) Field of Classification Search
  USPC ............................................................ 370/329
  See application file for complete search history.

(56) References Cited

U.S. PATENT DOCUMENTS

| | | | |
|---|---|---|---|
| 11,516,735 B2* | 11/2022 | Thangarasa | H04W 76/28 |
| 2008/0232310 A1* | 9/2008 | Xu | H04W 52/0216 370/329 |
| 2014/0254452 A1 | 9/2014 | Golitschek Edler Von Elbwart et al. | |
| 2015/0282208 A1* | 10/2015 | Yi | H04W 72/23 370/329 |
| 2016/0057724 A1* | 2/2016 | Horn | H04W 60/005 455/435.1 |
| 2016/0088681 A1 | 3/2016 | Chang et al. | |
| 2016/0212642 A1* | 7/2016 | Ljung | H04W 76/28 |
| 2016/0212706 A1* | 7/2016 | Kahtava | H04W 72/542 |
| 2017/0222905 A1* | 8/2017 | Leroux | H04L 43/0876 |
| 2018/0242388 A1* | 8/2018 | Park | H04W 52/0216 |
| 2018/0314314 A1* | 11/2018 | Link, II | G06F 1/3246 |
| 2018/0376384 A1* | 12/2018 | Youn | H04W 92/02 |
| 2019/0058532 A1* | 2/2019 | Nagaraja | H04W 24/08 |
| 2019/0132824 A1* | 5/2019 | Jeon | H04L 5/0092 |
| 2019/0132862 A1* | 5/2019 | Jeon | H04L 5/0098 |
| 2019/0207662 A1* | 7/2019 | Zhou | H04W 24/08 |
| 2019/0238345 A1* | 8/2019 | Gage | H04W 24/10 |
| 2019/0342833 A1* | 11/2019 | Åström | H04W 8/24 |
| 2019/0373441 A1* | 12/2019 | Ryu | H04W 48/18 |
| 2020/0022081 A1* | 1/2020 | Ljung | H04W 8/24 |
| 2020/0037386 A1* | 1/2020 | Park | H04W 80/10 |
| 2020/0163017 A1* | 5/2020 | Priyanto | H04W 88/04 |
| 2021/0153120 A1* | 5/2021 | Atungsiri | H04L 27/2636 |
| 2022/0039008 A1* | 2/2022 | Nimbalker | H04W 52/02 |
| 2022/0116908 A1* | 4/2022 | Chun | H04W 76/27 |

FOREIGN PATENT DOCUMENTS

| | | |
|---|---|---|
| CN | 108307406 A | 7/2018 |
| WO | 2018203822 A1 | 11/2018 |

OTHER PUBLICATIONS

Examination Report for Indian Application No. 202117035740 dated Apr. 4, 2022. 5 pages with English translation.
Extended European Search Report for European Application No. 19915402.2 dated Dec. 23, 2021. 10 pages.

* cited by examiner

DISCONTINUOUS RECEPTION METHOD, TERMINAL DEVICE AND NETWORK DEVICE

CROSS-REFERENCE TO RELATED APPLICATION

The present application is a continuation application of International PCT Application No. PCT/CN2019/075283, filed on Feb. 15, 2019, the entire content of which is hereby incorporated by reference.

TECHNICAL FIELD

Implementations of the present disclosure relate to the field of wireless communication, and more particularly, relate to a method for discontinuous reception, a terminal device, and a network device.

BACKGROUND

Discontinuous Reception (DRX) mechanism is introduced for power saving of the terminal device. Each DRX Cycle includes an on-duration and an Opportunity for DRX. When being in the on-duration, the terminal device monitors a control channel. When being in the Opportunity for DRX, the terminal device can reduce power consumption by stopping receiving the control channel (in this case, the terminal device stops blind detection of the control channel), thus prolonging battery usage time.

Although the network device configures the terminal device with the DRX mechanism for the terminal device to periodically monitor the control channel in the on-duration, this DRX mechanism is not flexible enough, especially in a scenario where there are a large number of users in the system this issue is acute.

SUMMARY

Implementations of the present disclosure provide a method for discontinuous reception, a terminal device and a network device, which can optimize DRX mechanism, thereby further reducing power consumption.

In a first aspect, a method for discontinuous reception (DRX) is provided, including: a first terminal device monitors a downlink control channel, wherein the downlink control channel carries m pieces of DRX information respectively for m terminal devices including the first terminal device, where m is a positive integer, wherein, each piece of DRX information in the m pieces of DRX information is used for indicating at least one of the following: a target bandwidth part (BWP), a target DRX configuration, a target DRX parameter, and a time length for monitoring a PDCCH during an on-duration of a DRX cycle.

Optionally, if the each piece of DRX information is used for indicating the target BWP, the each piece of DRX information is specifically used for indicating that a working BWP of each terminal device after DRX information of the each terminal device is the target BWP; and/or if the each piece of DRX information is used for indicating the target DRX configuration, the each piece of DRX information is specifically used for indicating each terminal device to use the target DRX configuration after DRX information of each terminal device; and/or if the each piece of DRX information is used for indicating the target DRX parameter, the each piece of DRX information is specifically used for indicating each terminal device to use the target DRX parameter after DRX information of each terminal device; and/or if the each piece of DRX information is used for indicating the time length for monitoring the PDCCH in the on-duration of a DRX cycle, the each piece of DRX information is specifically used for indicating each terminal device to monitor the PDCCH in the time length of the on-duration of the DRX cycle after the DRX information of the each terminal device.

In a second aspect, a method for discontinuous reception is provided, including: a network device sends a downlink control channel, wherein the downlink control channel carries m pieces of DRX information respectively for m terminal devices including the first terminal device, where m is a positive integer, wherein, each piece of DRX information in the m pieces of DRX information is used for indicating at least one of the following: a target BWP, a target DRX configuration, a target DRX parameter, and a time length for monitoring a PDCCH in an on-duration of a DRX cycle.

Optionally, if the each piece of DRX information is used for indicating the target BWP, the each piece of DRX information is specifically used for indicating that a working BWP of each terminal device after DRX information of the each terminal device is the target BWP; and/or if the each piece of DRX information is used for indicating the target DRX configuration, the each piece of DRX information is specifically used for indicating each terminal device to use the target DRX configuration after DRX information of the each terminal device; and/or if the each piece of DRX information is used for indicating the target DRX parameter, the each piece of DRX information is specifically used for indicating each terminal device to use the target DRX parameter after DRX information of the each terminal device; and/or if the each piece of DRX information is used for indicating the time length for monitoring the PDCCH in the on-duration of the DRX cycle, the each piece of DRX information is specifically used for indicating each terminal device to monitor the PDCCH in the time length of the on-duration of DRX cycle after DRX information of the each terminal device.

In a third aspect, a terminal device is provided, which is configured to perform the method in the first aspect or any of various implementations thereof.

Specifically, the terminal device includes function modules for performing the method in the above first aspect or any of various implementations thereof.

In a fourth aspect, a network device is provided, which is configured to perform the methods in the second aspect or any of various implementations thereof.

Specifically, the network device includes functional modules for performing the method in the above second aspect or any of various implementations thereof.

In a fifth aspect, a terminal device is provided, which includes a processor and a memory. The memory is configured to store a computer program, and the processor is configured to call and run the computer program stored in the memory to perform the method in the first aspect or in any of various implementations thereof.

In a sixth aspect, a network device is provided, which includes a processor and a memory. The memory is configured to store a computer program, and the processor is configured to call and run the computer program stored in the memory to perform the method in the second aspect or in any of various implementations thereof.

In a seventh aspect, a chip is provided, and configured to implement the method in any one of the above first to second aspects or various implementation thereof.

Specifically, the chip includes a processor, which is configured to call and run a computer program from a memory to enable a device in which the chip is installed to perform the method in any one of the above first aspect and second aspect or various implementations thereof.

In an eighth aspect, a computer readable storage medium is provided, which is configured to store a computer program, the computer program enables a computer to perform the method according to any one of the first and second aspects described above and various implementations thereof.

In a ninth aspect, a computer program product is provided, including computer program instructions that enable a computer to perform the method in any one of the above first to second aspects or various implementation thereof.

In a tenth aspect, a computer program is provided, when the computer program is run on a computer, the computer is enabled to perform the method according to any one of the first and second aspects described above and various implementations thereof.

With the above technical solution, the network device indicates multiple pieces of DRX information of multiple terminal devices to the multiple terminal devices at the same time, and the first terminal device in the multiple terminal devices can perform corresponding operations according to its own DRX information, such as switching to the target BWP, or modifying of DRX configuration or DRX parameters. Therefore, energy saving of the terminal devices and BWP control are achieved to improve system efficiency, and the service characteristics of terminal devices is better matched to improve system efficiency.

Furthermore, a single control signaling (such as PDCCH) can often carry indication information of ten or even tens of users, which greatly improves indication efficiency and saves resource overhead of indication for a single user.

DETAILED DESCRIPTION

Technical solutions in implementations of the present disclosure are described below with reference to accompanying drawings.

It should be understood that, the technical solutions of the implementations of the present disclosure may be applied to various communications systems, for example, a Global System of Mobile communication (GSM) system, a Code Division Multiple Access (CDMA) system, a Wideband Code Division Multiple Access (WCDMA) system, a Long Term Evolution (LTE) system, an LTE Frequency Division Duplex (FDD) system, LTE Time Division Duplex (TDD), a Universal Mobile Telecommunication System (UMTS) system, and a future 5G communication system.

Various implementations are described with reference to a terminal device in the present disclosure. The terminal device may be a User Equipment (UE), an access terminal, a user unit, a user station, a mobile site, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved Public Land Mobile Network (PLMN), or the like.

Various implementations are described with reference to a network device in the present disclosure. A network device may be a device for communicating with a terminal device, such as a base station (Base Transceiver Station, abbreviated as BTS) in a GSM system or CDMA, a base station (Node B, abbreviated as NB) in a WCDMA system, or an evolved base station (Evolutional Node B, abbreviated as eNB or eNode B) in an LTE system, or the network device may be a relay station, an access point, a vehicle-mounted device, a wearable device, a network side device in a future 5G network, or a network side device in a future evolved PLMN network, etc.

Figure 1:
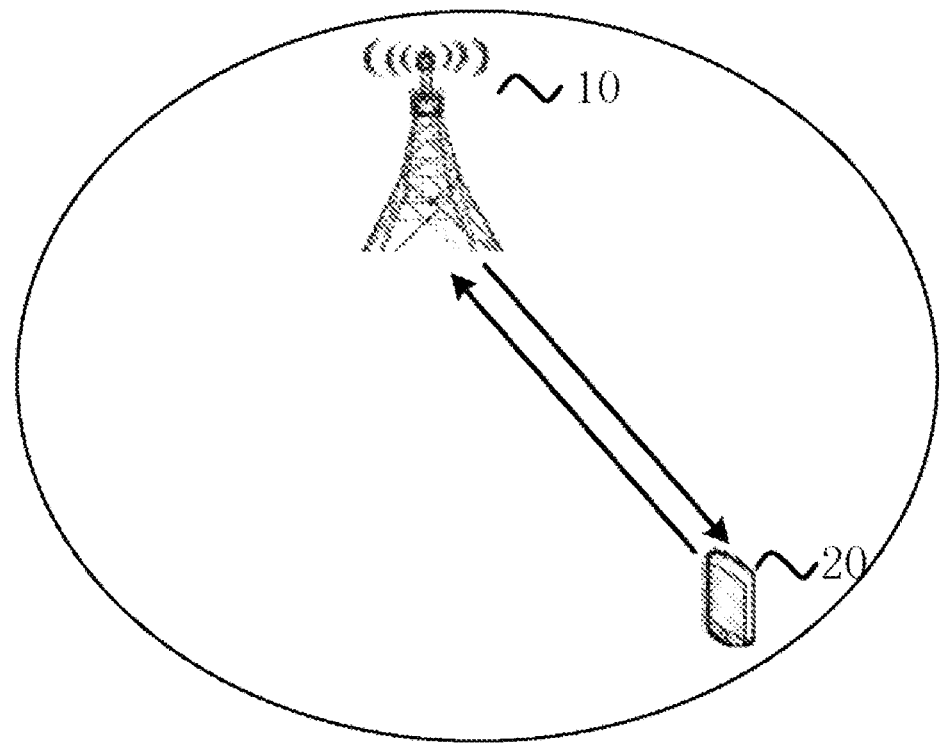
FIG. 1 is a schematic diagram of an architecture of an application scenario according to an implementation of the present disclosure.

FIG. 1 is a schematic diagram of an application scenario according to an implementation of the present disclosure. A communication system in FIG. 1 may include a network device 10 and a terminal device 20. The network device 10 is configured to provide communication services to the terminal device 20 and connect the terminal device 20 to a core network. The terminal device 20 may access a network by searching for a synchronization signal, a broadcast signal, and the like that are sent by the network device 10, to communicate with the network. An arrow shown in FIG. 1 may represent uplink/downlink transmission performed over a cellular link between the terminal device 20 and the network device 10.

The network in this implementation of this application may be a Public Land Mobile Network (PLMN), a Device to Device (D2D) network, a Machine to Machine/Man (M2M) network, or another network. FIG. 1 is an example of a simplified schematic diagram, and the network may further include other terminal devices, which are not shown in FIG. 1.

Figure 2:
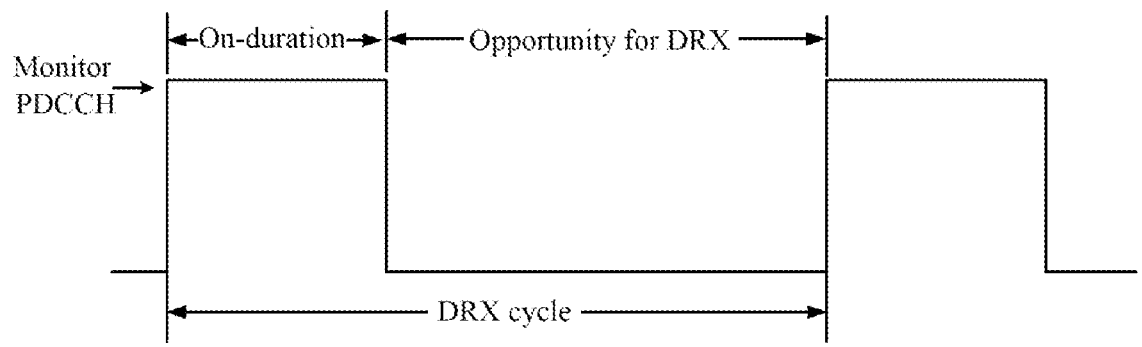
FIG. 2 is a schematic diagram of a DRX cycle.

A DRX cycle of the terminal device includes an on-duration and an Opportunity for DRX. As shown in FIG. 2, the terminal device may detect (or monitor) a Physical Downlink Control Channel (PDCCH) during the on-duration, while during the Opportunity for DRX, the terminal device may reduce power consumption by stopping receiving the PDCCH (in this case, the terminal device stops blind detection of the PDCCH), thus prolonging battery usage time. In other words, during an active time, the terminal device is in a wake-up state so as to monitor the PDCCH, and during the Opportunity for DRX, the terminal device enters a sleep state so as not to monitor a channel or signal.

Although the network configures the terminal device with the DRX cycle for the terminal device to periodically monitor the PDCCH during the on-duration, the terminal device is scheduled only opportunistically during the on-duration. Even when the terminal device has a very low service load, the terminal device will be scheduled only in a few DRX cycles. For a paging message using the DRX mechanism, the terminal has fewer opportunities of receiving the paging message. Therefore, after being configured with the DRX mechanism, the terminal device may not detect any control channel out during on-durations of most DRX cycles, but it will still be woken up during the on-durations of these DRX cycles, which increases unnecessary power consumption of the terminal device. Therefore, different terminal devices need to know whether they are actually scheduled during an on-duration in a DRX cycle, so as to keep asleep when not scheduled, to further reduce power consumption.

In the implementations of the present disclosure, the terminal device may be configured with multiple BWPs. After the terminal devices enters a DRX state, a currently activated BWP of the terminal device may be different from a BWP that the network device expects the terminal device to use when data transmission is performed during the DRX on-duration of the terminal device. For example, the currently activated BWP of the terminal device is a BWP with a relatively narrow bandwidth, but at this time the network device needs to transmit a large amount of data to the terminal device, in this case the BWP with a relatively large bandwidth is beneficial to quickly transmitting the data of the terminal device. For another example, the currently activated BWP of the terminal device is a BWP with a larger bandwidth, but at this time the network device needs to transmit a smaller amount of data to the terminal device, in this case, a BWP with a smaller bandwidth benefits to power saving of the terminal device. Therefore, the network device switching the BWP of the terminal device in advance before the DRX on-duration is beneficial to improving system efficiency and power saving of the terminal device.

In addition, timely notifying the terminal device to modify DRX configuration or DRX parameters or the like enables the setting of DRX configuration or parameters to better match service characteristics of the terminal device, which is more beneficial to energy saving of the terminal device.

How to efficiently indicate to the terminal device switching of the BWP, whether to wake up in DRX on-duration, and indication information such as DRX configuration or DRX parameter update is a problem to be solved. In particular, in a scenario where there are a large numbers of users in the system, how to achieve the reuse of indication information for multiple users and improve transmission efficiency of indication information for multiple users is also a problem to be solved.

Figure 3:
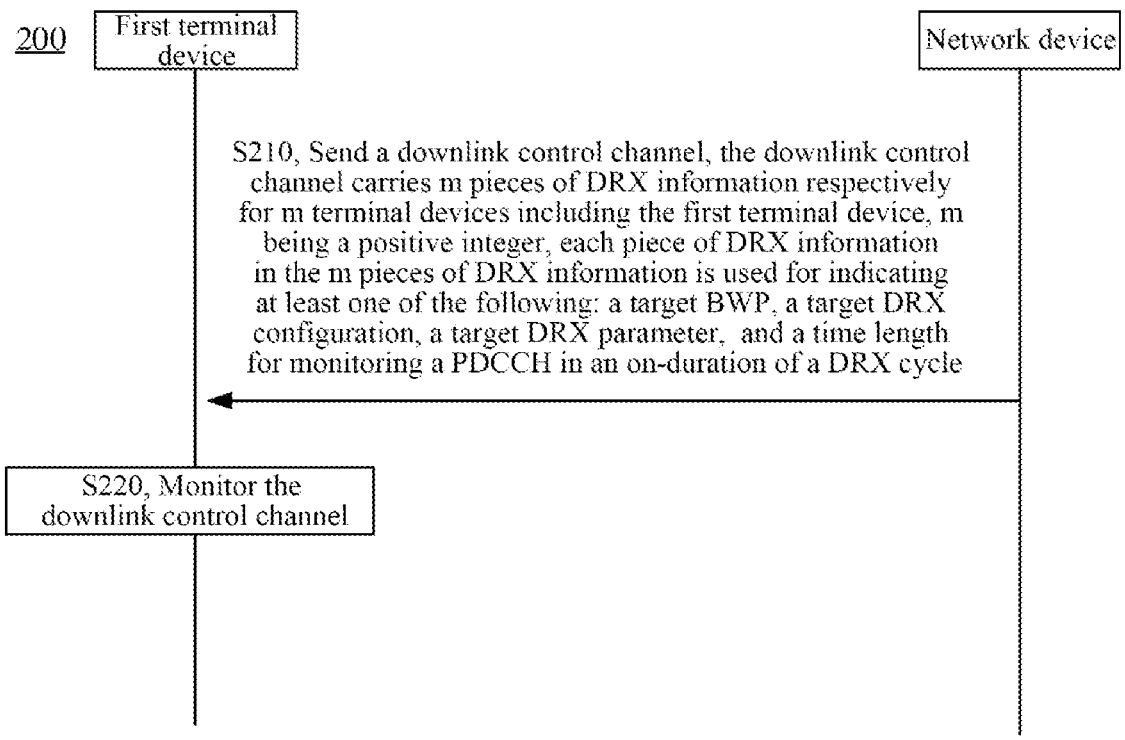
FIG. 3 is a schematic flowchart of a method for discontinuous reception according to an implementation of the present disclosure.

FIG. 3 is a schematic flowchart of a method for discontinuous reception according to an implementation of the present disclosure. The method shown in FIG. 3 may be performed by a terminal device. The terminal device is a first terminal device which may be, for example, the terminal device 20 shown in FIG. 1. As shown in FIG. 3, the method for discontinuous reception includes the following acts 210-220.

In S210, a network device sends a downlink control channel to a first terminal device, wherein the downlink control channel carries m pieces of DRX information respectively for m terminal devices including the first terminal device, where m is a positive integer, wherein, each piece of DRX information in the m pieces of DRX information is used for indicating at least one of the following: a target BWP, a target DRX configuration, a target DRX parameter, and a time length for monitoring a PDCCH in an on-duration of a DRX cycle.

If each piece of DRX information is used for indicating the target BWP, each piece of DRX information is specifically used for indicating that a working BWP of each terminal device after DRX information of the each terminal device is the target BWP; and/or if each piece of DRX information is used for indicating the target DRX configuration, each piece of DRX information is specifically used for indicating each terminal device to use the target DRX configuration after DRX information of each terminal device; and/or if each piece of DRX information is used for indicating the target DRX parameter, each piece of DRX information is specifically used for indicating each terminal device to use the target DRX parameter after the DRX information of each terminal device; and/or if each piece of DRX information is used for indicating the time length for monitoring the PDCCH in the on-duration of the DRX cycle, each piece of DRX information is specifically used for indicating each terminal device to monitor the PDCCH in the time length of the on-duration of the DRX cycle after DRX information of the each terminal device.

In S220, the first terminal device monitors the downlink control channel sent by the network device.

Optionally, the downlink control channel may be a Physical downlink Control Channel (PDCCH).

For example, each piece of DRX information is used for indicating a target BWP, a working BWP of the first terminal device after the first terminal device detects DRX information for the first terminal device itself out is the target BWP.

For another example, each piece of DRX information is used for indicating a target DRX configuration, the first terminal device uses the target DRX configuration after detecting DRX information for the first terminal device itself out.

For another example, each piece of DRX information is used for indicating a target DRX parameter, the first terminal device uses the target DRX parameter after detecting DRX information for the first terminal device itself out.

For another example, each piece of DRX information is used for indicating a time length for monitoring PDCCH in an on-duration of a DRX cycle, the first terminal device monitors the PDCCH in the time length of the on-duration of the DRX cycle after detecting DRX information for the first terminal device itself out.

Optionally, each piece of DRX information of the m pieces of DRX information is further used for indicating each terminal device to wake up or sleep during an on-duration of a DRX cycle after DRX information of the each terminal device.

In other words, each piece of DRX information in the m pieces of DRX information is used for indicating each terminal device to specifically respond to the content indicated by each piece of DRX information after the DRX information of each terminal device is detected out.

Optionally, the on-duration in the DRX cycle after a time point when the DRX information of each terminal device is detected out may include: an on-duration of a DRX cycle for receiving the DRX information, or an on-duration of a next DRX cycle of a DRX cycle for receiving the DRX information, or an on-duration of an X-th DRX cycle after a DRX cycle for receiving the DRX information, where X is an integer greater than 1.

Specifically, the network device sends the downlink control channel to the m terminal devices to simultaneously indicate respective DRX information to the m terminal devices. The DRX information of each terminal device is used for indicating each terminal device to specifically respond to the content indicated by each piece of DRX information after the DRX information of each terminal device is detected out. For example, when each piece of DRX information indicates each terminal device to wake up or sleep during the on-duration in the DRX cycle after the DRX information of each terminal device, each piece of DRX information represents whether the each terminal device is scheduled during the on-duration of the DRX cycle after a time point when the DRX information of the each terminal device is detected out. If the terminal device is scheduled, the terminal device needs to wake up, and if the terminal is not scheduled, the terminal device sleeps to reduce the power consumption. For example, if the first terminal device detects the downlink control information out in the i-th DRX cycle and acquires its own DRX information, then the DRX information may indicate the first terminal device to wake up or sleep during an on-duration of the (i+1)-th DRX cycle. For another example, each piece of DRX information is used for indicating the target BWP, assumed that the first terminal device detects the downlink control information out at time point t and acquires its own DRX information, the first terminal device works in the target BWP after the time point t. For another example, each piece of DRX information is used for indicating the time length for monitoring the PDCCH during the on-duration of the DRX cycle, assumed that the first terminal device detects the downlink control information out in the i-th DRX cycle and acquires its own DRX information, then the DRX information may indicate a time length for the first terminal device to monitor a PDCCH in an on-duration of the (i+1)-th DRX cycle is T1.

Optionally, the downlink control channel carries m sets of bit values, and the m sets of bit values correspond to the m pieces of DRX information in one-to-one correspondence. Each set of bit values in the m sets of bit values include n bit values which are used for representing each piece of DRX information, where n is a positive integer.

For example, Downlink Control Information (DCI) in the downlink control channel carries the m sets of bit values, which may be specifically shown in Table 1 below.

TABLE 1

| | m sets of bit values | | | |
|---|---|---|---|---|
| Bit values | First set of bit values | Second set of bit values | Third set of bit values | ... | m-th set of bit values |
| Corresponding terminal | First terminal | Second terminal | Third terminal | ... | m-th terminal |

It should be noted that the information indicated by the n bit values may be pre-agreed by the terminal device and the network device through a protocol, or the information indicated by the n bit values is configured by the network device.

As shown in Table 2, assumed that each piece of DRX information in the m pieces of DRX information is e further used for indicating the each terminal device to wake up or sleep during an on-duration of a DRX cycle after the DRX information of the each terminal device. In addition, the downlink control channel carries m sets of bit values, and the m sets of bit values correspond to the m pieces of DRX information in one-to-one correspondence. Each set of bit value in the m sets of bit values includes a value of one bit, which is used for representing each piece of DRX information. If the value of this one bit value is taken as 0, it is indicated that DRX corresponding to the set of bit value is used for indicating the terminal device to sleep during the on-duration of a subsequent DRX cycle without monitoring a PDCCH. If the value of this one bit value is taken as 1, it is indicated that DRX corresponding to the set of bit value is used for indicating the terminal device to wake up during the on-duration group of the subsequent DRX cycle to detect information such as a PDCCH or a paging message.

TABLE 2

| | Value of bit in m sets of bit values | | | |
|---|---|---|---|---|
| Bit value | 1 | 0 | 1 | 1 |
| DRX information | Wake up | Sleep | Wake up | Wake up |

Of course, a bit value of 0 may be used for indicating wake-up, and a bit value of 1 may be used for indicating sleep. Table 2 serves as an example only.

It should be noted that the above Table 2 serves as an example only, and the implementation of the present disclosure does not limit a specific table form, table size, and a specific meaning corresponding to the value of bit.

For another example, when the each piece of DRX information is used for indicating each terminal device to switch to the target BWP after the DRX information of each terminal device and indicating each terminal device to wake up or sleep during the on-duration of the DRX cycle after the DRX information of each terminal device, n bits may be used to indicate different information. For example, when n=2, that is, each set of bit values includes 2 bit values, and different bit values may indicate the terminal device A to perform corresponding operations after the terminal device A detects its own DRX information out, as shown in Table 3.

TABLE 3

| | Value of a set of bits | | | |
|---|---|---|---|---|
| | 00 | 01 | 10 | 11 |
| Information indicated | Indicating terminal device A to sleep in the on-duration of the DRX cycle after DRX information is detected out | Indicating that terminal device A is activated in the on-duration in the DRX cycle after DRX information is detected out, and a target working BWP is BWP1 | Indicating that terminal device A is activated in the on-duration in the DRX cycle after DRX information is detected out, and a target working BWP is BWP2 | Indicating that terminal device A is activated in the on-duration in the DRX cycle after DRX information is detected out, and a target working BWP is BWP3 |

It should be noted that the above Table 3 serves as an example only, and the implementation of the present disclosure does not limit a specific table form, table size, and a specific meaning corresponding to the value of bits.

For another example, when the each piece of DRX information is used for indicating each terminal device to switch to the target BWP after the DRX information of each terminal device, indicating each terminal device to wake up or sleep in the on-duration of the DRX cycle after the DRX information of each terminal device, and indicating to each terminal device the time length for monitoring the downlink control channel in the on-duration of the DRX cycle after the DRX information of each terminal device, n bits may be used for indicating different information, for example n=3. If n=3, that is, each set of bit values includes 3 bit values, for example, the set of bits for terminal device A is set A of bits, and the bit values of set A of bits may indicate the terminal device A to perform corresponding operations after the terminal device A detects its own DRX information out, specifically as shown in Table 4.

TABLE 4

| Value of set A of bits | Information indicated |
|---|---|
| 000 | Indicating terminal device A to sleep in the on-duration of the DRX cycle after DRX information is detected out |
| 001 | Indicating that terminal device A is activated in the on- of the DRX cycle after DRX information is detected out, a duration target working BWP is BWP1, and a time length for monitoring PDCCH in the on-duration of the DRX cycle is T1 |
| 010 | Indicating that terminal device A is activated in the on-duration of DRX cycle after DRX information is detected out, a target working BWP is BWP1, and a time length for monitoring PDCCH in the on-duration of the DRX cycle is T2 |
| 011 | Indicating that terminal device A is activated in the on-duration of DRX cycle after DRX information is detected out, the target working BWP is BWP2, and the time length for monitoring PDCCH in the on-duration of DRX cycle is T1 |
| 100 | Indicating that terminal device A is activated in the on-duration of the DRX cycle after DRX information is detected out; the target working BWP is BWP2, and the time length for monitoring PDCCH in the on-duration of DRX cycle is T2 |
| 101 | Indicating that terminal device A is activated in the on-duration of DRX cycle after DRX information is detected out, and the target working BWP is BWP3, and the time length for monitoring PDCCH in the on-duration of DRX cycle is T1 |
| 110 | Indicating that terminal device A is activated in the on-duration of DRX cycle after DRX information is detected out, and the target working BWP is BWP3, and the time length for monitoring PDCCH in the on-duration of DRX cycle is T2 |
| 111 | Reserved |

It should understood that, BWP1, BWP2 and BWP3 in Table 4 above are the target BWPs for terminal device A. Similarly, T1 and T2 are the time lengths of monitoring the downlink control channel in the on-duration of the DRX cycle after the DRX information for the terminal device A.

It should be noted that the above Table 4 serves as an example only, and the implementation of the present disclosure does not limit a specific Table form, table size, and a specific meaning corresponding to the value of bits.

Optionally, before the act S220, that is, before the first terminal device monitors the downlink control channel sent by the network device, the method further includes: the first terminal device determines a control channel group to which the downlink control channel belongs according to a device identity of the first terminal device; and the first terminal device determines a target radio network temporary identity (RNTI) corresponding to the control channel group according to a mapping relationship between multiple control channel groups and multiple RNTIs.

In this case, in act S220, monitoring, by the first terminal device, the downlink control channel sent by the network device includes: the first terminal device monitors the downlink control channel according to the target RNTI.

For example, the first terminal device calculates a number of the control channel group that the downlink control channel is located in according to the device identity (ID) of the first terminal device, such as UE-ID and based on UE-ID mod Q, wherein Q is a positive integer and Q is the total quantity of control channel groups. The first terminal device determines an RNTI for monitoring the downlink control channel according to the number of the control channel group acquired by calculating and a mapping relationship between Q control channel groups and Q RNTIs, and monitors the downlink control channel according to the target RNTI.

Optionally, the mapping relationship between multiple control channel groups and multiple RNTIs may be notified by the network device through a radio resource control (RRC) signaling to the terminal device, or the mapping relationship may be pre-agreed between the terminal device and the network device and pre-stored in the terminal device. In addition, the mapping relationship between multiple control channel groups and multiple RNTIs may be presented by any means such as a chart, table, formula, etc.

Optionally, before the act S220, that is, before the first terminal device monitors the downlink control channel sent by the network device, the method further includes: the first terminal device receives first configuration information sent by the network device, wherein the first configuration information indicates a target RNTI for monitoring the downlink control channel;

In this case, in act S220, monitoring, by the first terminal device, the downlink control channel sent by the network device includes: the first terminal device monitors the downlink control channel according to the target RNTI.

The network device may allocate different target RNTIs for different terminal devices, and different target RNTIs may support different downlink control channels, therefore it is supported that DRX information may be configured for more users, thus greatly improving indication efficiency and saving resource overhead of indication for a single user.

Optionally, the first configuration information may be, for example, sent by the network device to the first terminal device through an RRC signaling or a Medium Access Control (MAC) Control Element (CE), and the first terminal device may directly acquire the target RNTI through the received RRC signaling or MAC CE.

Optionally, before act S220, that is, before the first terminal device monitors the downlink control channel sent by the network device, the method further includes: the first terminal device receives second configuration information sent by the network device, wherein the second configuration information is used for indicating a channel format of the downlink control channel.

In this case, in act S220, monitoring, by the first terminal device, the downlink control channel sent by the network device includes: the first terminal device monitors the downlink control channel according to the channel format of the downlink control channel.

The second configuration information may be, for example, sent by the network device to the first terminal device through an RRC signaling or an MAC CE, and the first terminal device may acquire the channel format for monitoring the downlink control channel through the received RRC signaling or MAC CE.

For example, it is assumed that the downlink control channel carries Download Control Information (DCI), and the DCI carries m pieces of discontinuous reception (DRX) information for m terminal devices respectively. If m is relatively large, that is, the network device needs to send the downlink control channel to a large number of terminal devices at the same time, then the network device may use a first DCI format to send the downlink control channel carrying the DCI. If m is relatively small, that is, the network device needs to send the downlink control channel to a small number of terminal devices at the same time, then the terminal device may use a second DCI format to send the downlink control channel carrying the DCI. The quantity of bits for representing multiple pieces of DRX information in the DCI of the first DCI format is greater than that in the DCI of the second DCI format. The network device indicates the channel format used (e.g., the first DCI format or the second DCI format) to the first terminal device, so that the first terminal device may detect the DCI including its own DRX information carried on the downlink control channel based on the corresponding DCI format.

Optionally, in act S220, monitoring, by the first terminal device, the downlink control channel sent by the network device includes: the first terminal device monitors the downlink control channel sent by the network device before the DRX cycle; or the first terminal device monitors the downlink control channel sent by the network device in a first subframe or a first slot during the on-duration of the DRX cycle; or the first terminal device monitors the downlink control channel sent by the network device in a common search space of a control channel.

Optionally, in Example one, it is assumed that each piece of DRX information is used for indicating each terminal device to wake up or sleep during the on-duration of the DRX cycle after the DRX information of each terminal device. For example, if the first terminal device monitors the downlink control channel out in the i-th DRX cycle and determines its own DRX information according to the downlink control channel, then the DRX information may indicate the first terminal device to wake up or sleep in an on-duration of the (i+1)-th DRX cycle, or indicate the first terminal device to wake up or sleep in on-durations of the (i+1)-th DRX cycle and multiple DRX cycles after the (i+1)-th DRX cycle. For another example, if the first terminal device may monitor the downlink control channel out in the first subframe or the first slot in the on-duration of the i-th DRX cycle and determine its own DRX information according to the downlink control channel, then the DRX information may indicate the first terminal device to wake up or sleep during the on-duration of the i-th DRX cycle. For instance, the first terminal device monitors the downlink control channel out in the first subframe in the on-duration of a certain DRX cycle and knows that sleep needs to be performed during the on-duration of the DRX cycle, the first terminal device may go to sleep from the second subframe in the on-duration of the DRX cycle till the end of the DRX cycle, to reduce power consumption. For another example, if the first terminal device monitors the downlink control channel out in a common search space of a control channel and determines its own DRX information according to the downlink control channel, then the DRX information indicates the first terminal device to wake up or sleep during an on-duration or on-durations of one or more DRX cycles after the time point when the DRX information is detected out.

Figure 4:
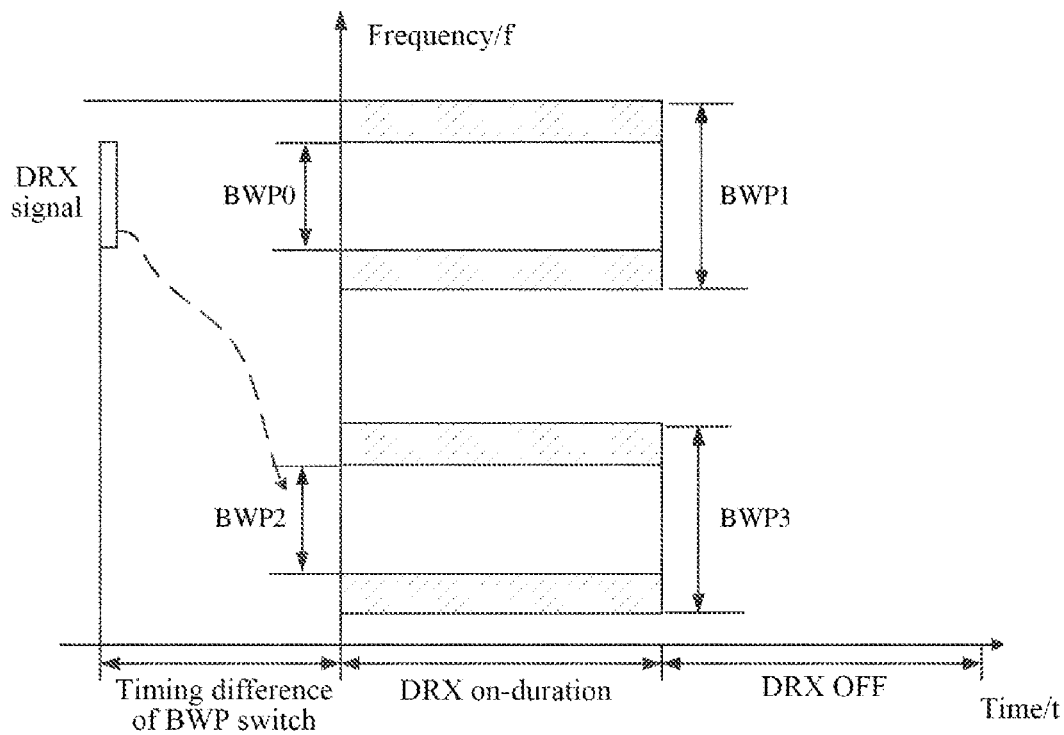
FIG. 4 is a schematic diagram of DRX information indication according to an implementation of the present disclosure.
Figure 5:
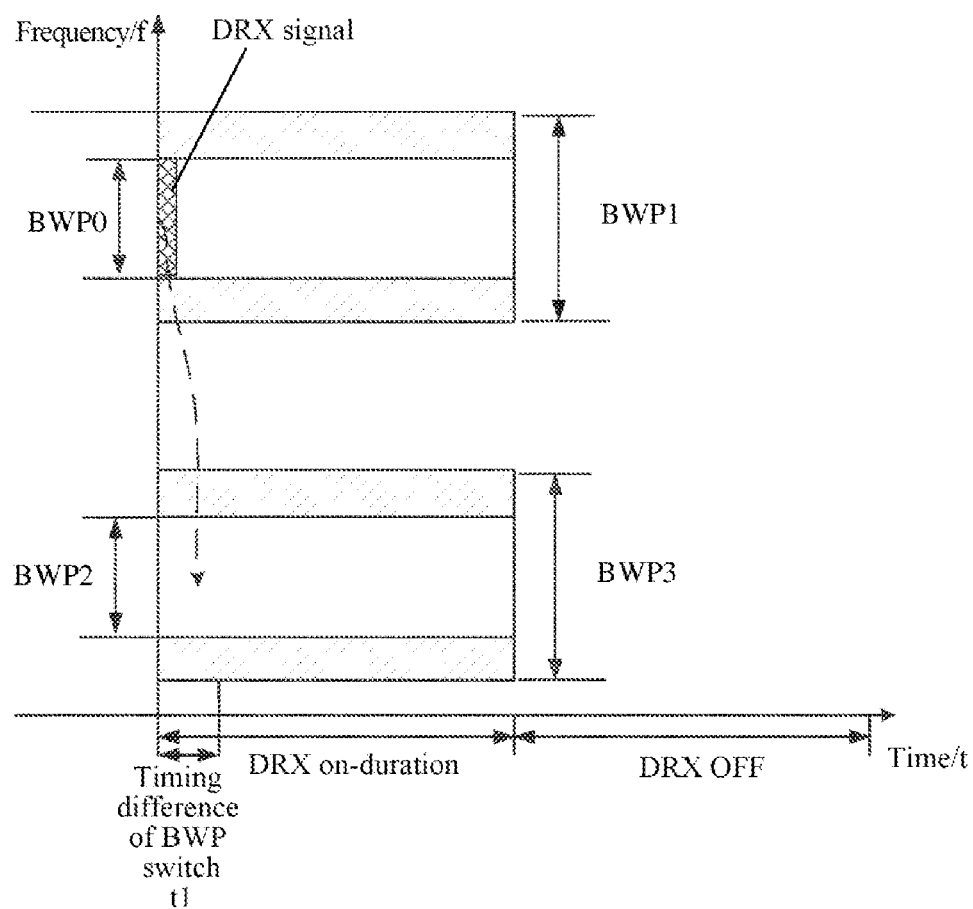
FIG. 5 is a schematic diagram of another DRX information indication according to an implementation of the present disclosure.

Optionally, in Example two, it is assumed that each piece of DRX information is used for indicating each terminal device to switch to the target BWP after the DRX information of each terminal device. For example, if the first terminal device monitors the downlink control channel out in the i-th DRX cycle and determines its own DRX information according to the downlink control channel, the DRX information may indicate the first terminal device to switch to the target BWP before the on-duration of the (i+1)-th DRX cycle, so that the first terminal device may transmit data on the target BWP. The specific process is shown in the following FIG. 4, the currently activated BWP of the first terminal device is BWP0, and the network device may indicate the terminal to switch to BWP3 (target BWP) before the DRX on-duration of the next DRX cycle through DRX indication information. For another example, if the first terminal device may monitor the downlink control channel out in the first subframe or the first slot in the on-duration of the ith DRX cycle and determine its own DRX information according to the downlink control channel, then the DRX information may indicate the first terminal device to switch to the target BWP during the on-duration of the i-th DRX cycle. The specific process is shown in the following FIG. 5, the first terminal device receives the DRX information in the first slot of the DRX on-duration, and the DRX information indicates the first terminal to switch to BWP3 (target BWP), then the first terminal device needs to switch to BWP3 at time point t1. For another example, if the first terminal device monitors the downlink control channel out in a common search space of a control channel and determines its own DRX information according to the downlink control channel, then the DRX information indicates the first terminal device to switch to the target BWP after the DRX information is detected out. A time difference between a time point for the first terminal device to receive the signaling and a time point for the first terminal device to switch to the target BWP may be pre-agreed by the network device and the first terminal device through a protocol or notified to the first terminal device by the network device through signaling.

Optionally, in an implementation of the present disclosure, the first terminal device determines DRX information for the first terminal device from the m pieces of DRX information.

Optionally, the first terminal device determines the DRX information of the first terminal device according to a number of the first terminal device, wherein the DRX information of the first terminal device is DRX information corresponding to the number in the m pieces of DRX information.

Optionally, before the first terminal device determines the DRX information of the first terminal device according to the number of the first terminal device, the method further includes: the first terminal device receives third configuration information sent by the network device, wherein the third configuration information is used for indicating the number of the first terminal device.

The third configuration information may be, for example, sent by the network device to the first terminal device through an RRC signaling or an MAC CE, and the first terminal device may acquire the number of the first terminal device through the received RRC signaling or MAC CE.

Assumed that the downlink control channel carries m sets of bit values, which correspond to the m pieces of DRX information in one-to-one correspondence, and in the downlink control channel, m sets of bit values may correspond to the numbers of m terminal devices in sequence, as shown in Table 5 below.

When numbers of terminal devices are different, the corresponding pieces of DRX information are different, the bit values representing the DRX information are also different. If the network device informs that the number of the first terminal device is 1, then it corresponds to the first set of bit values, and the terminal device may read the first set of bit values to acquire DRX indication information; if the network device informs that the number of the first terminal device is 2, then it corresponds to the second set of bit values.

TABLE 5

| | m sets of bit values | | | |
|---|---|---|---|---|
| Bit values | First set of bit values | Second set of bit values | Third set of bit values | m-th set of bit values |
| Number of corresponding terminal | 1 | 2 | 3 | ... m |

It should be noted that the above Table 5 serves as an example only, and the implementation of the present disclosure does not limit a specific table form, table size, and a specific meaning corresponding to the value of bit.

Therefore, the network device indicates multiple pieces of DRX information of multiple terminal devices to the multiple terminal devices at the same time, and the first terminal device in the multiple terminal devices determines its own DRX information from the multiple pieces of DRX information, and performs corresponding operations according to its own DRX information, such as waking up or sleeping in the on-duration of DRX, or switching of the target BWP, or modifying of the DRX configuration or DRX parameters. Therefore energy saving of the terminals and BWP control are achieved to improve system efficiency or energy saving of the terminals, and the service characteristics of terminals is better matched to improve system efficiency.

In addition, a single control signaling (such as PDCCH) can often carry indication information of ten or even tens of users, which greatly improves indication efficiency and saves resource overhead of the indication for a single user.

Figure 6:
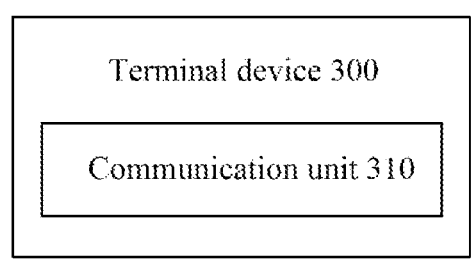
FIG. 6 is a schematic block diagram of a terminal device according to an implementation of the present disclosure.

FIG. 6 is a schematic block diagram of a terminal device 300 according to an implementation of the present disclosure. The terminal device 300 is a first terminal device. As shown in FIG. 6, the terminal device 300 includes a communication unit 310.

The communication unit 310 is configured to monitor a downlink control channel, wherein the downlink control channel carries m pieces of DRX information respectively for m terminal devices including the first terminal device, where m is a positive integer, wherein, each piece of DRX information in the m pieces of DRX information is used for indicating at least one of the following:

a target bandwidth part (BWP), a target DRX configuration, a target DRX parameter, and a time length for monitoring a PDCCH in an on-duration of a DRX cycle.

Optionally, if each piece of DRX information is used for indicating the target BWP, each piece of DRX information is specifically used for indicating that a working BWP of each terminal device after DRX information of each terminal device is the target BWP; and/or if each piece of DRX information is used for indicating the target DRX configuration, each piece of DRX information is specifically used for indicating each terminal device to use the target DRX configuration after DRX information of each terminal device; and/or if each piece of DRX information is used for indicating the target DRX parameter, each piece of DRX information is specifically used for indicating each terminal device to use the target DRX parameter after DRX information of each terminal device; and/or if each piece of DRX information is used for indicating the time length for monitoring the PDCCH in the on-duration of the DRX cycle, each piece of DRX information is specifically used for indicating each terminal device to monitor the PDCCH in the time length of the on-duration of the DRX cycle after the DRX information of each terminal device.

Optionally, each piece of DRX information of the m pieces of DRX information is further used for indicating each terminal device to wake up or sleep during an on-duration of a DRX cycle after DRX information of the each terminal device.

Optionally, the downlink control channel carries m sets of bit values, and the m sets of bit values correspond to the m pieces of DRX information in one-to-one correspondence. Each set of bit values in the m sets of bit values includes n bit values which are used for representing each piece of DRX information, where n is a positive integer.

Optionally, the terminal device 300 further includes a processing unit 320.

The processing unit 320 is configured to determine a control channel group to which the downlink control channel belongs according to a device identity of the first terminal device.

The processing unit 320 is further configured to determine a target RNTI corresponding to the control channel group according to a mapping relationship between multiple control channel groups and multiple RNTIs.

The communication unit 310 is specifically configured to monitor the downlink control channel according to the target RNTI.

Optionally, the communication unit 310 is further configured to receive first configuration information, wherein the first configuration information indicates a target RNTI for monitoring the downlink control channel.

The communication unit 310 is specifically configured to monitor the downlink control channel according to the target RNTI.

Optionally, the communication unit 310 is further configured to receive second configuration information, wherein the second configuration information is used for indicating a channel format of the downlink control channel.

The communication unit 310 is specifically configured to monitor the downlink control channel according to the channel format of the downlink control channel.

Optionally, the communication unit 310 is specifically configured to monitor the downlink control channel sent before the DRX cycle; or monitor the downlink control channel sent in a first subframe or a first slot during the on-duration of the DRX cycle; or monitor the downlink control channel sent in a common search space of a control channel.

Optionally, the terminal device 300 further includes a processing unit 320.

The processing unit 320 is configured to determine DRX information for the first terminal device from the m pieces of DRX information.

Optionally, the processing unit 320 is specifically configured to determine the DRX information of the first terminal device according to a number of the first terminal device, wherein the DRX information of the first terminal device is DRX information corresponding to the number in the m pieces of DRX information.

Optionally, the communication unit 310 is further configured to receive third configuration information, wherein the third configuration information is used for indicating the number of the first terminal device.

It should be understood that the terminal device 300 according to the implementation of the present disclosure may correspond to the first terminal device in the method implementation of the present disclosure, and the above-mentioned and other operations and/or functions of various units in the terminal device 300 are respectively for implementing corresponding processes of the first terminal device in the method 200 shown in FIG. 3, which will not be repeated here for brevity.

Figure 7:
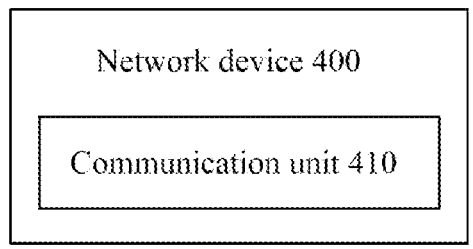
FIG. 7 is a schematic block diagram of a network device according to an implementation of the present disclosure.

FIG. 7 is a schematic block diagram of a network device 400 according to an implementation of the present disclosure. As shown in FIG. 7, the network device 400 includes a communication unit 410.

The communication unit 410 is configured to send a downlink control channel to a first terminal device, wherein the downlink control channel carries m pieces of DRX information respectively for m terminal devices including the first terminal device, where m is a positive integer, wherein, each piece of DRX information in the m pieces of DRX information is used for indicating at least one of the following: a target BWP, a target DRX configuration, a target DRX parameter, and a time length for monitoring a PDCCH in an on-duration of a DRX cycle.

Optionally, if each piece of DRX information is used for indicating the target BWP, each piece of DRX information is specifically used for indicating that a working BWP of each terminal device after DRX information of the each terminal device is the target BWP; and/or if each piece of DRX information is used for indicating the target DRX configuration, each piece of DRX information is specifically used for indicating each terminal device to use the target DRX configuration after DRX information of each terminal device; and/or if each piece of DRX information is used for indicating the target DRX parameter, each piece of DRX information is specifically used for indicating each terminal device to use the target DRX parameter after DRX information of each terminal device; and/or if each piece of DRX information is used for indicating the time length for monitoring the PDCCH in the on-duration of the DRX cycle, each piece of DRX information is specifically used for indicating each terminal device to monitor the PDCCH in the time length of the on-duration of the DRX cycle after DRX information of each terminal device.

Optionally, each piece of DRX information of the m pieces of DRX information is further used for indicating each terminal device to wake up or sleep during an on-duration of a DRX cycle after DRX information of the each terminal device.

Optionally, the downlink control channel carries m sets of bit values, and the m sets of bit values correspond to the m pieces of DRX information in one-to-one correspondence. Each set of bit values in the m sets of bit values includes n bit values which are used for representing each piece of DRX information, where n is a positive integer.

Optionally, the communication unit 410 is further configured to send a mapping relationship between multiple control channel groups and multiple radio network temporary identities (RNTIs), wherein the mapping relationship is used for the first terminal device to determine a target RNTI for monitoring the downlink control channel.

Optionally, the communication unit 410 is further configured to send first configuration information, wherein the first configuration information indicates a target RNTI for monitoring the downlink control channel.

Optionally, the communication unit 410 is further configured to send second configuration information, wherein the second configuration information is used for indicating a channel format of the downlink control channel.

Optionally, the communication unit 410 is specifically configured to send the downlink control channel before the DRX cycle; or send the downlink control channel in a first subframe or a first slot during the on-duration of the DRX cycle; or send the downlink control channel in a common search space of a control channel.

Optionally, the communication unit 410 is further configured to send third configuration information, wherein the third configuration information indicates a number of the first terminal device, and the DRX information of the first terminal device is DRX information corresponding to the number in the m pieces of DRX information.

It should be understood that the network device 400 according to the implementation of the present disclosure may correspond to the network device in the method implementations of the present disclosure. And the above and other operations and/or functions of various units in the network device 400 are respectively for implementing the corresponding process of the network device in the method 200 shown in FIG. 3, which is not repeated here again for brevity.

Figure 8:
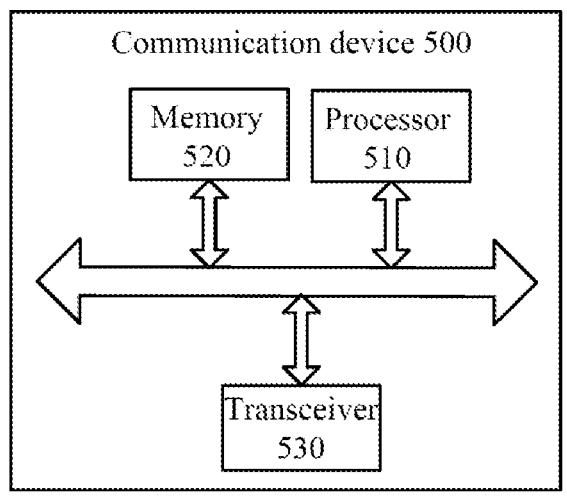
FIG. 8 is a schematic block diagram of a communication device according to an implementation of the present disclosure.

FIG. 8 is a schematic diagram of a structure of a communication device 500 according to an implementation of the present disclosure. The communication device 500 shown in FIG. 8 includes a processor 510, which may call and run a computer program from a memory to implement the methods according to the implementations of the present disclosure.

Optionally, as shown in FIG. 8, the communication device 500 may further include a memory 520. The processor 510 may call and run a computer program from the memory 520 to implement the methods in the implementations of the present disclosure.

The memory 520 may be a separate device independent of the processor 510 or may be integrated in the processor 510.

Optionally, as shown in FIG. 8, the communication device 500 may further include a transceiver 530, and the processor 510 may control the transceiver 530 to communicate with other devices. Specifically, the transceiver 530 may send information or data to other devices or receive information or data sent by other devices.

The transceiver 530 may include a transmitter and a receiver. The transceiver 530 may further include antennas, and a quantity of the antennas may be one or more.

Optionally, the communication device 500 may be specifically the network device of the implementations of the present disclosure, and the communication device 500 may implement the corresponding processes implemented by the network device in various methods of the implementations of the present disclosure, which will not be repeated here for brevity.

Optionally, the communication device 500 may specifically be a mobile terminal/terminal device of the implementations of the present disclosure, and the communication device 500 may implement the corresponding processes implemented by the first terminal device in various methods of the implementations of the present disclosure, which will not be repeated here for brevity.

Figure 9:
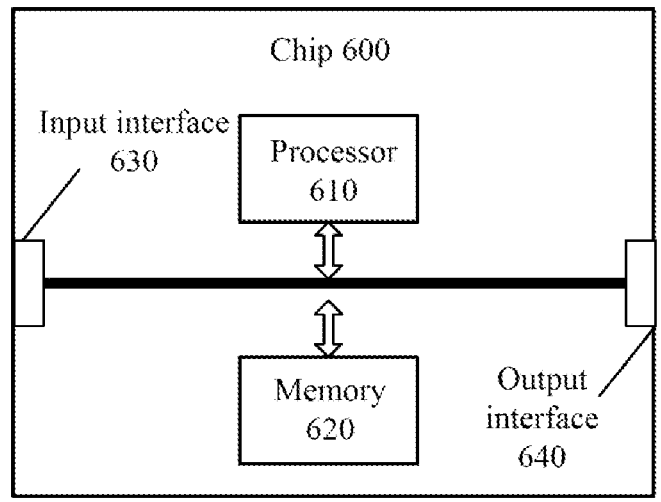
FIG. 9 is a schematic block diagram of a chip according to an implementation of the present disclosure.

FIG. 9 is a schematic diagram of a structure of a chip according to an implementation of the present disclosure. A chip 600 shown in FIG. 9 includes a processor 610. The processor 610 may call and run a computer program from a memory to implement methods in the implementations of the present disclosure.

Optionally, as shown in FIG. 9, the chip 600 may further include a memory 620. The processor 610 may call and run a computer program from the memory 620 to implement the methods in the implementations of the present disclosure.

The memory 620 may be a separate device independent of the processor 610 or may be integrated in the processor 610.

Optionally, the chip 600 may further include an input interface 630. The processor 610 may control the input interface 630 to communicate with other devices or chips, and specifically, may acquire information or data sent by other devices or chips.

Optionally, the chip 600 may further include an output interface 640. The processor 610 may control the output interface 640 to communicate with other devices or chips, and specifically, may output information or data to other devices or chips.

Optionally, the chip may be applied to the network device in the implementations of the present disclosure, and the chip may implement the corresponding processes implemented by the network device in various methods of the implementations of the present disclosure, which will not be repeated here for brevity.

Optionally, the chip may be applied to the mobile terminal/terminal device in the implementations of the present disclosure, and the chip may implement the corresponding processes implemented by the first terminal device in various methods of the implementations of the present disclosure, which will not be repeated here for brevity.

It should be understood that the chip mentioned in the implementations of the present disclosure may be referred to as a system-level chip, a system chip, a chip system or a system-on-chip, etc.

Figure 10:
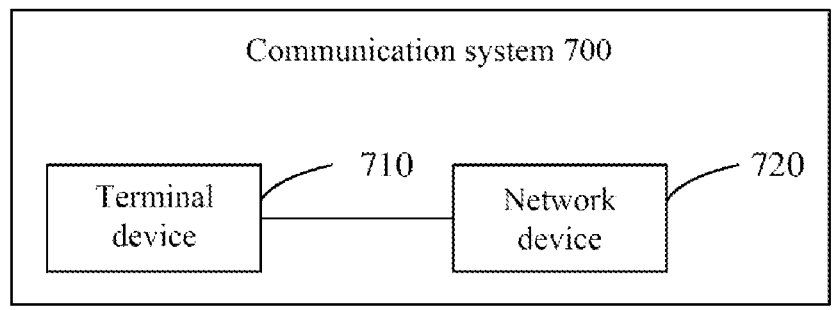
FIG. 10 is a schematic block diagram of a communication system according to an implementation of the present disclosure.

FIG. 10 is a schematic block diagram of a communication system 700 according to an implementation of the present disclosure. As shown in FIG. 10, the communication system 700 may include a terminal device 710 and a network device 720.

Herein, the terminal device 710 may be configured to implement corresponding functions implemented by the first terminal device in the above-mentioned methods, and the network device 720 may be configured to implement corresponding functions implemented by the network device in the above-mentioned methods, which will not be repeated here for brevity.

It should be understood that the processor in the implementations of the present disclosure may be an integrated circuit chip having a signal processing capability. In an implementation process, the acts of the foregoing method implementations may be implemented by an integrated logic circuit of hardware in the processor or instructions in a form of software. The processor may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or perform various methods, acts and logical block diagrams disclosed in the implementations of the present disclosure. The general purpose processor may be a microprocessor, or the processor may be any conventional processor or the like. The acts of the methods disclosed in combination with the implementations of the present disclosure may be directly embodied to be implemented by a hardware decoding processor, or may be implemented by a combination of hardware in the decoding processor and software modules. The software modules may be located in a storage medium commonly used in the art, such as a random access memory, a flash memory, a read-only memory, a programmable read-only memory or an electrically erasable programmable memory, or a register. The storage medium is located in a memory, and the processor reads the information in the memory and completes the acts of the above methods in combination with its hardware.

It can be understood that the memory in the implementations of the present disclosure may be a volatile memory or a non-volatile memory, or may include both a volatile memory and a non-volatile memory. The non-transitory memory may be a Read-Only Memory (ROM), a Programmable ROM (PROM), an Erasable PROM (EPROM), an Electrically EPROM (EEPROM), or a flash memory. The volatile memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described here is intended to include, without being limited to, these and any other suitable types of memories.

It should be understood that the foregoing memory is an example for illustration, but not for limiting. For example, the memory in the implementations of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, memories in the implementations of the present disclosure are intended to include, without being limited to, these and any other suitable types of memories.

An implementation of the present disclosure further provides a computer readable storage medium configured to store a computer program.

Optionally, the computer readable storage medium may be applied to the network device in the implementations of the present disclosure, and the computer program enables a computer to perform the corresponding processes implemented by the network device in various methods of the implementations of the present disclosure, which will not be repeated here for brevity.

Optionally, the computer-readable storage medium may be applied in the mobile terminal/terminal device of the implementations of the present disclosure, and the computer program enables a computer to perform the corresponding processes implemented by the first terminal device in various methods of the implementations of the present disclosure, which will not be repeated here for brevity.

An implementation of the present disclosure also provides a computer program product including computer program instructions.

Optionally, the computer program product may be applied to the network device in the implementations of the present disclosure, and the computer program instructions enable a computer to perform the corresponding processes implemented by the network device in various methods of the implementations of the present disclosure, which will not be repeated here for brevity.

Optionally, the computer program product may be applied in the mobile terminal/terminal device of the implementations of the present disclosure, and the computer program instructions cause a computer to perform corresponding processes implemented by the first terminal device in various methods according to the implementation of the present disclosure, which will not be repeated here for brevity.

An implementation of the present disclosure also provides a computer program.

Optionally, the computer program may be applied to the network device of the implementations of the present disclosure. When the computer program is run on a computer, the computer is enabled to perform corresponding processes implemented by the network device in various methods of the implementations of the present disclosure, which will not be repeated here for brevity.

Optionally, the computer program may be applied in the mobile terminal/terminal device of the implementations of the present disclosure. When the computer program is run on the computer, the computer is enabled to perform the corresponding processes implemented by the first terminal device in various methods of the implementations of the present disclosure, which is not described here for brevity.

Those of ordinary skills in the art may recognize that the example units and algorithm acts described in combination with the implementations disclosed herein may be implemented in electronic hardware, or a combination of computer software and electronic hardware. Whether these functions are implemented in hardware or software depends on a specific application and design constraints of the technical solutions. Professional technicians may use different methods to implement the described functions in respect to each particular application, but such implementations should not be considered to be beyond the scope of the present disclosure.

Those skilled in the art may clearly understand that for convenience and conciseness of description, as to the specific working processes of the systems, apparatuses and units described above, reference may be made to the corresponding processes in the above method implementations, which will not be repeated here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division modes in an actual implementation, for example, multiple units or components may be combined or integrated into another system, or some features may be ignored or not executed. On the other hand, the discussed or displayed mutual coupling or direct coupling or communication connection may be indirect coupling or communication connection through some interfaces, apparatuses or units, which may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the objects of the solutions of the implementations.

In addition, various functional units in various implementations of the present disclosure may be integrated in one processing unit, or the various units may be physically present separately, or two or more units may be integrated in one unit.

When the functions are implemented in the form of software functional units and sold or used as an independent product, the software functional units may be stored in a computer readable storage medium. Regarding such understanding, the technical solution of the present disclosure, in essence, or the part contributing to the prior art, or the part of the technical solution, may be embodied in a form of a software product, wherein the computer software product is stored in a storage medium, and includes a number of instructions for causing a computer device (which may be a personal computer, a server, or a network device, or the like) to perform all or part of the acts of the methods described in various implementations of the present disclosure. The above storage medium includes any medium that can store program codes, such as a USB flash disk, a removable hard disk, a Read-Only Memory (ROM), a Random Access Memory (RAM), a magnetic disk, or an optical disk.

The foregoing descriptions are merely specific implementations of the present disclosure, but the protection scope of the present disclosure is not limited thereto. Any variation or substitution that may be readily conceived by any person skilled in the art within the technical scope disclosed by the present disclosure shall fall within the protection scope of the present disclosure. Therefore, the protection scope of the present disclosure shall be subjected to the protection scope of the claims.

What I claim is:

1. A method for discontinuous reception, comprising:
monitoring, by a first terminal device, a downlink control channel, wherein the downlink control channel carries m pieces of discontinuous reception (DRX) information respectively for m terminal devices comprising the first terminal device, where m is a positive integer, wherein,
each piece of DRX information in the m pieces of DRX information is used for indicating at least one of the following:
a target bandwidth part (BWP), a target DRX configuration, a target DRX parameter, and a time length for monitoring a physical downlink control channel (PDCCH) in an on-duration of a DRX cycle.

2. The method of claim 1, wherein, the downlink control channel carries m sets of bit values, and the m sets of bit values correspond to the m pieces of DRX information in one-to-one correspondence, each set of bit values in the m sets of bit values comprises n bit values which are used for representing the each piece of DRX information, where n is a positive integer.

3. The method of claim 1, further comprising:
receiving, by the first terminal device, first configuration information, wherein the first configuration information indicates a target radio network temporary identity (RNTI) for monitoring the downlink control channel;
wherein monitoring, by the first terminal device, the downlink control channel comprises:
monitoring, by the first terminal device, the downlink control channel according to the target RNTI.

4. The method of claim 1, further comprising:
receiving, by the first terminal device, second configuration information, wherein the second configuration information is used for indicating a channel format of the downlink control channel;
wherein monitoring, by the first terminal device, the downlink control channel comprises:
monitoring, by the first terminal device, the downlink control channel according to the channel format of the downlink control channel.

5. The method of claim 1, wherein monitoring, by the first terminal device, the downlink control channel comprises:
monitoring, by the first terminal device, the downlink control channel sent before the DRX cycle; or
monitoring, by the first terminal device, the downlink control channel sent in a first subframe or a first slot during the on-duration of the DRX cycle; or
monitoring, by the first terminal device, the downlink control channel sent in a common search space of a control channel.

6. The method of claim 1, further comprising:
determining, by the first terminal device, DRX information for the first terminal device from the m pieces of DRX information.

7. A method for discontinuous reception, comprising:
sending, by a network device, a downlink control channel to a first terminal device, wherein the downlink control channel carries m pieces of discontinuous reception (DRX) information respectively for m terminal devices comprising the first terminal device, where m is a positive integer, wherein,
each piece of DRX information in the m pieces of DRX information is used for indicating at least one of the following:
a target bandwidth part (BWP), a target DRX configuration, a target DRX parameter, and a time length for monitoring a physical downlink control channel (PDCCH) in an on-duration of a DRX cycle.

8. The method of claim 7, wherein, the downlink control channel carries m sets of bit values, and the m sets of bit values correspond to the m pieces of DRX information in one-to-one correspondence; each set of bit values in the m sets of bit values comprises n bit values which are used for representing the each piece of DRX information, and n is a positive integer.

9. The method of claim 7, further comprising:
sending, by the network device, first configuration information, wherein the first configuration information indicates a target RNTI for monitoring the downlink control channel.

10. The method of claim 7, further comprising:
sending, by the network device, second configuration information, wherein the second configuration information is used for indicating a channel format of the downlink control channel.

11. The method of claim 7, wherein sending, by the network device, the downlink control channel comprises:
sending, by the network device, the downlink control channel before the DRX cycle; or
sending, by the network device, the downlink control channel in a first subframe or a first slot during the on-duration of the DRX cycle; or
sending, by the network device, the downlink control channel in a common search space of a control channel.

12. The method of claim 7, further comprising:
sending, by the network device, third configuration information to the first terminal device, wherein the third configuration information indicates a number of the first terminal device, and the DRX information for the first terminal device is DRX information corresponding to the number in the m pieces of DRX information.

13. A terminal device, wherein the terminal device is a first terminal device, comprising: a processor and a transceiver, wherein
the transceiver is configured to monitor a downlink control channel, wherein the downlink control channel carries m pieces of discontinuous reception (DRX) information respectively for m terminal devices comprising the first terminal device, where m is a positive integer, wherein,
each piece of DRX information in the m pieces of DRX information is used for indicating at least one of the following:
a target bandwidth part (BWP), a target DRX configuration, a target DRX parameter, and a time length for monitoring a physical downlink control channel (PDCCH) in an on-duration of a DRX cycle.

14. The terminal device of claim 13, wherein, the downlink control channel carries m sets of bit values, and the m sets of bit values correspond to the m pieces of DRX information in one-to-one correspondence; each set of bit values in the m sets of bit values comprises n bit values which are used for representing the each piece of DRX information, and n is a positive integer.

15. The terminal device of claim 13, wherein,
the transceiver is further configured to receive first configuration information, wherein the first configuration information indicates a target RNTI for monitoring the downlink control channel;
the transceiver is specifically configured to monitor the downlink control channel according to the target RNTI.

16. The terminal device of claim 13, wherein,
the transceiver is further configured to receive second configuration information, wherein the second configuration information is used for indicating a channel format of the downlink control channel;
the transceiver is specifically configured to monitor the downlink control channel according to the channel format of the downlink control channel.

17. The terminal device of claim 13, wherein the transceiver is specifically configured to,
monitor the downlink control channel sent before the DRX cycle; or
monitor the downlink control channel sent in a first subframe or a first slot during the on-duration of the DRX cycle; or
monitor the downlink control channel sent in a common search space of a control channel.

18. The terminal device of claim 13, wherein the processor is configured to determine DRX information for the first terminal device from the m pieces of DRX information.

19. A network device, comprising: a processor and a transceiver, wherein
the transceiver is configured to send a downlink control channel to a first terminal device, wherein the downlink control channel carries m pieces of discontinuous reception (DRX) information respectively for m terminal devices including the first terminal device, where m is a positive integer, wherein,
each piece of DRX information in the m pieces of DRX information is used for indicating at least one of the following:
a target bandwidth part (BWP), a target DRX configuration, a target DRX parameter, and a time length for monitoring a physical downlink control channel (PDCCH) in an on-duration of a DRX cycle.

20. The network device of claim 19, wherein, the downlink control channel carries m sets of bit values, and the m sets of bit values correspond to the m pieces of DRX information in one-to-one correspondence; each set of bit values in the m sets of bit values comprises n bit values which are used for representing the each piece of DRX information, and n is a positive integer.

21. The network device of claim 19, wherein the transceiver is further configured to send first configuration information, wherein the first configuration information indicates a target RNTI for monitoring the downlink control channel.

22. The network device of claim 19, wherein, the transceiver is further configured to send second configuration information, wherein the second configuration information is used for indicating a channel format of the downlink control channel.

23. The network device of claim 19, wherein the transceiver is specifically configured to:
   send the downlink control channel before the DRX cycle; or
   send the downlink control channel in a first subframe or a first slot during the on-duration of the DRX cycle; or
   send the downlink control channel in a common search space of a control channel.

24. The network device of claim 19, wherein the transceiver is further configured to send third configuration information to the first terminal device, wherein the third configuration information indicates a number of the first terminal device, and the DRX information for the first terminal device is DRX information corresponding to the number in the m pieces of DRX information.

* * * * *